(12) United States Patent
Sennett et al.

(10) Patent No.: US 8,626,129 B2
(45) Date of Patent: Jan. 7, 2014

(54) AUTOMATIC HOLD WITH OUTGOING MESSAGE FOR A MOBILE DEVICE

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1338 days.

(21) Appl. No.: 12/053,070

(22) Filed: Mar. 21, 2008

(65) Prior Publication Data

US 2009/0239509 A1    Sep. 24, 2009

(51) Int. Cl.
*H04M 11/10*    (2006.01)

(52) U.S. Cl.
USPC ............... 455/413; 455/412.1; 455/412.2; 455/414.1; 455/415

(58) Field of Classification Search
None
See application file for complete search history.

(56) References Cited

U.S. PATENT DOCUMENTS

| | | | |
|---|---|---|---|
| 6,216,016 B1* | 4/2001 | Cronin | 455/567 |
| 6,393,272 B1* | 5/2002 | Cannon et al. | 455/413 |
| 7,136,458 B1* | 11/2006 | Zellner et al. | 379/88.02 |
| 7,283,829 B2* | 10/2007 | Christenson et al. | 455/461 |
| 2002/0142756 A1* | 10/2002 | Rutledge et al. | 455/412 |
| 2005/0147212 A1* | 7/2005 | Benco et al. | 379/84 |
| 2005/0227740 A1* | 10/2005 | Orbach | 455/567 |
| 2006/0031340 A1* | 2/2006 | Mathew et al. | 709/206 |
| 2006/0128365 A1* | 6/2006 | Kamdar et al. | 455/414.3 |
| 2007/0047522 A1* | 3/2007 | Jefferson et al. | 370/352 |
| 2007/0211869 A1* | 9/2007 | Kiiskinen | 379/101.01 |
| 2008/0056466 A1* | 3/2008 | Nishimura | 379/88.22 |
| 2008/0112555 A1* | 5/2008 | Johns | 379/207.02 |
| 2009/0003580 A1* | 1/2009 | Sharpe et al. | 379/211.02 |
| 2010/0128857 A1* | 5/2010 | Logan | 379/88.22 |
| 2010/0177879 A1* | 7/2010 | Liljestrand et al. | 379/201.02 |
| 2010/0312912 A1* | 12/2010 | Arsenault et al. | 709/238 |

* cited by examiner

*Primary Examiner* — Dai A Phuong
(74) *Attorney, Agent, or Firm* — Woodcock Washburn LLP

(57) ABSTRACT

A wireless communication network that is in communication with a mobile device, perhaps a cell phone, includes a call message system and a configurable component. The configurable component is configured to include a first mode that puts a call to the mobile device in a hold state for a first time period when the first mode is activated a first time. The configurable component is configured to also include a second mode that puts the call in communication with the call message system when the second mode is activated. The configurable component may activate the second mode when signaled to do so from the call.

30 Claims, 10 Drawing Sheets

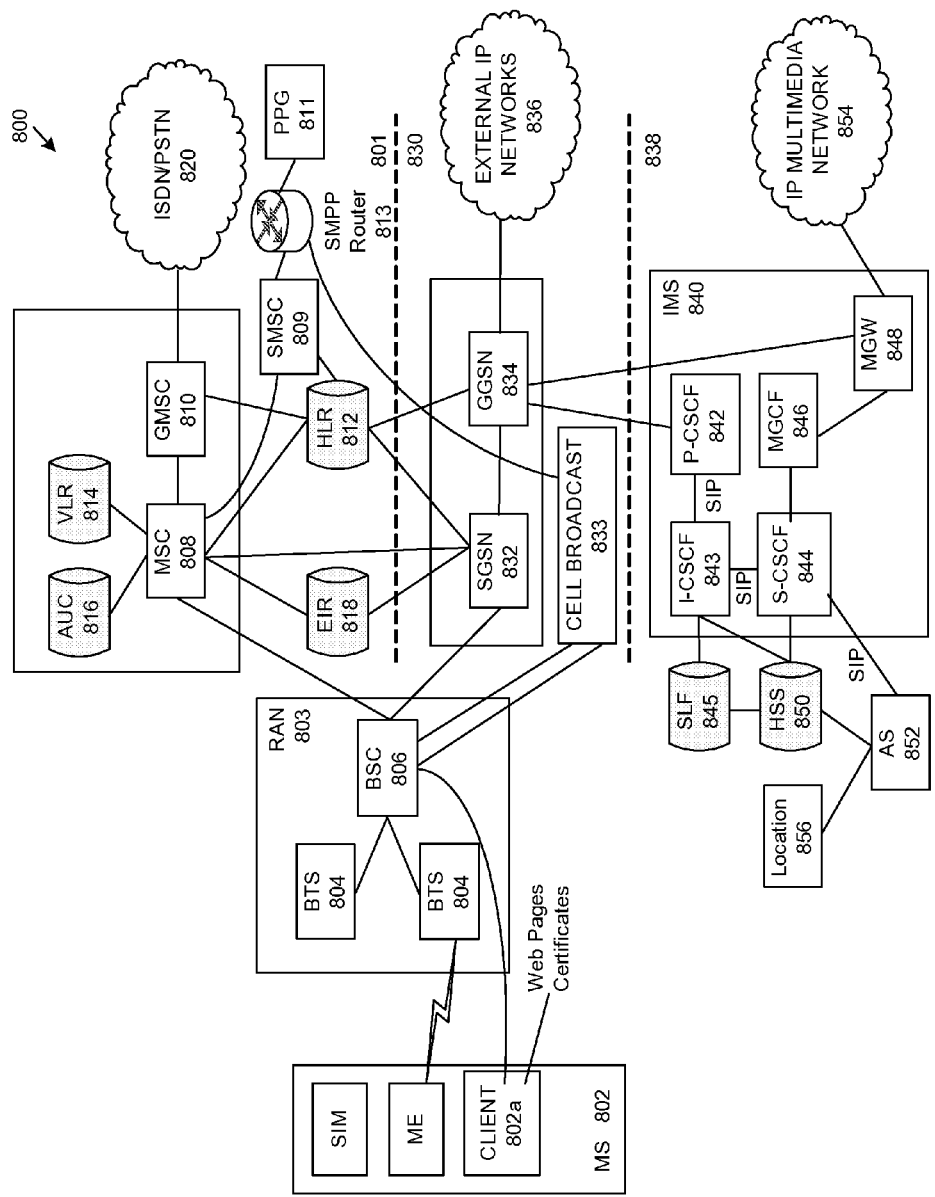

AUTOMATIC HOLD WITH OUTGOING MESSAGE FOR A MOBILE DEVICE

BACKGROUND OF THE INVENTION

Wireless communication devices such as cellular telephones (cell phone), other mobile communication devices that are combined with cellular telephones, cellular telephones that are combined with other electronic devices, such as digital cameras, and the like have become prevalent in society. Due to the small form factors of these mobile devices, subscribers and other users may often have the mobile device with them at all times of the day and night. For example, a user may have a cell phone clipped to a belt, in a brief case, purse or a computer bag, for example. Due to this ready availability of cell phones, it is not uncommon for a user to receive a call when the user is not ready at that present time to take the call.

When a cell phone user receives a call that the user cannot take at the time the call is received, both the user and the caller may face a frustrating situation. For example, in one instance, the cell phone user may either be on an existing call or in a location that prohibits taking a new call, such as a business meeting or the like, when the new call is received. In such a situation, the user may have to ignore the new call and let the new call self-terminate or perhaps let the new call be automatically redirected to a call message system, such as a voicemail system or the like. Thus, the user has missed the new call and may access a message from the call message system if a message was left by the caller. If no message was left by the caller, the user may only have the data from a call log to memorialize the call.

In another instance, the user may answer the new call, talk briefly and quickly with the caller and then put the call in a hold state, thereby maintaining ready access to the call. In this situation, the user, at least briefly, engages with the call before putting the call in the hold state. Also, the call in the hold state may wait until the user terminates the hold and engages the call or the call may self-terminate the hold state by ending the call and disconnecting from the user's cell phone or cellular network. A caller that is in a hold state for a period of time may come to believe that the user has forgotten about the call in the hold state, especially if the caller is given no status of the user's activity during the hold state. Thus, the call may be in the hold state for the entirety of the user's inconvenience with no clear indication of the user's status. Also, the caller who tires of waiting in the hold state may terminate the hold state by ending the call without the ability to leave the user any message.

Thus, mobile device users may benefit from a system that enables a user to put a call into a hold state without first conversing with the caller, but still providing the caller with a notification of the hold and the user's status during the hold. Callers to mobile devices may benefit by receiving a status of the mobile device user during the hold state. Callers may also benefit by having the ability to terminate a hold state by opting to leave a message on a call message system.

SUMMARY OF THE INVENTION

A wireless communication network may be in communication with a mobile device and may include a call message system and at least one component. The at least one component may be configured to include a first mode. The first mode may put a call to the mobile device in a hold state for a first predetermined time period upon a first activation of the first mode. The at least one component may be configured to include a second mode. The second mode may put the call in communication with the call message system upon an activation of the second mode. The at least one component may activate the second mode upon a signal from the call.

A mobile device may be in communication with a wireless communication network. The wireless communication network may include a call message system. The mobile device may be configured to include a first mode. The first mode may put a call to the mobile device in a hold state for a first predetermined time period upon a first activation of the first mode. The mobile device may be configured to include a second mode. The second mode may put the call in communication with the call message system upon an activation of the second mode. The mobile device may activate the second mode upon a signal from the call.

A method may provide a wireless communication network. The wireless communication network may be in communication with a mobile device. The wireless communication network may include a call message system and at least one component. The method may include configuring the at least one component to include a first mode. The first mode may put a call to the mobile device in a hold state for a first predetermined time period upon a first activation of the first mode. The method may also include configuring the at least one component to include a second mode. The second mode may put the call in communication with the call message system upon an activation of the second mode. The at least one component may activate the second mode upon a signal from the call.

A method may provide a mobile device. The mobile device may be in communication with a wireless communication network. The wireless communication network may include a call message system. The method may include configuring the mobile device to include a first mode. The first mode may put a call made to the mobile device in a hold state for a first predetermined time period upon a first activation of the first mode. The method may also include configuring the mobile device to include a second mode. The second mode may put the call in communication with the call message system upon an activation of the second mode. The mobile device may activate the second mode upon a signal from the call.

BRIEF DESCRIPTION OF THE DRAWINGS

FIG. 8 depicts an alternate block diagram of an example GSM/GPRS/IP multimedia network architecture in which aspects of an embodiment may be implemented.

DETAILED DESCRIPTION OF ILLUSTRATIVE EMBODIMENTS

Figure 1:
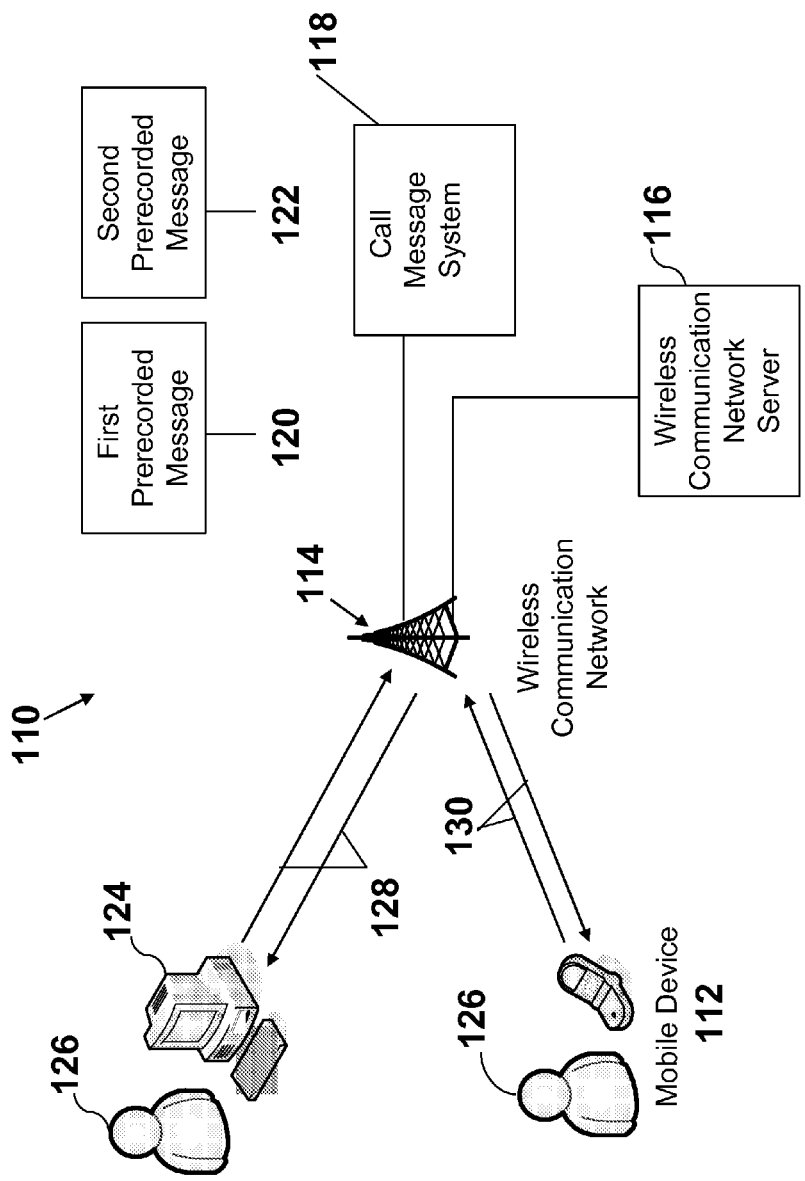
FIG. 1 depicts an overview of an architecture of a wireless communication system in which aspects of an embodiment may be implemented.

FIG. 1 depicts an overview of a wireless communication system 110 in which embodiments may be implemented. The wireless communication system (WCS) 110 may include but is not limited to a mobile device 112, a wireless communication network (WCN) 114, a wireless communication network server (WCNS) 116, a call message system (CMS) 118, a first prerecorded message (FPM) 120 and a second prerecorded message (SPM) 122. A mobile device user 126, who might also be referred to as a WCS 110 or WCN 114 subscriber or more simply as a user, may interface with the WCN 114 through the mobile device 112 which is in communication with the WCN 114 through wireless communication channel 130. The user 126 may also interface with the WCN 114 via a personal computer 124 that is in communication with the WCN 114 through communication channel 128. Communication channel 128 may include, but is not limited to an Internet based connection, a wireless connection such as radio frequency for example, a telephone based dial-up connection and the like.

The CMS 118 may be implemented as any system that is in communication with the WCN 114 and is capable of recording, digitally or otherwise, a message left by a caller after the call is put in communication with the CMS 118. The CMS 118 may be further capable of recording other data regarding the call, including but not limited to a call identification, the time of day the call was received and the time of the duration of the call (or message).

The mobile device 112 may be one of but not limited to a cellular telephone, a cellular telephone in combination with another electronic device and a cellular telephone in combination with another wireless communication device. By way of example, and not limitation, cell phones may be combined with electronic devices such as digital cameras and wireless communication devices such as a Blackberry™.

Figure 2:
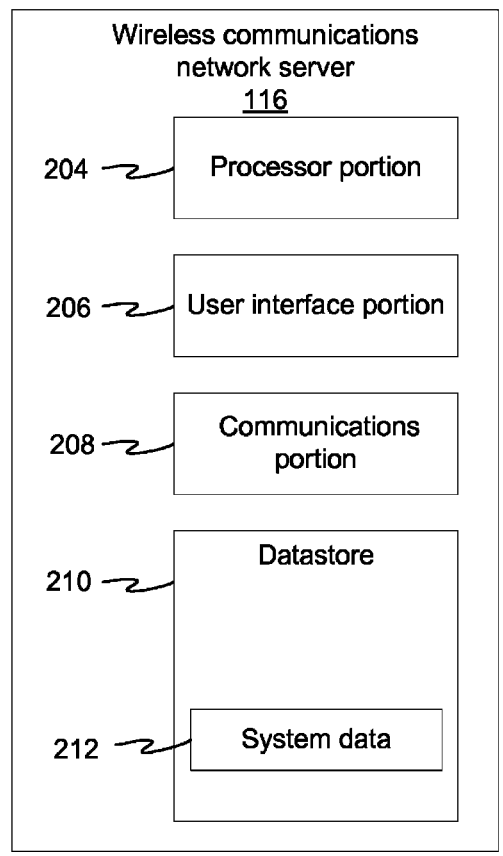
FIG. 2 depicts a block diagram of a wireless communication network server in which aspects of an embodiment may be implemented.

FIG. 2 depicts a block diagram of an example WCNS 116 which may be implemented in embodiments. The WCNS 116 may be implemented as, but is not limited to, a network server, a network controller, a network switch or any component, system and/or subsystem capable of operating as the WCSN 116 is described in any of the embodiments. The WCNS 116 may also be in combination with another component of the WCN 114, such as but not limited to the CMS 118. The WCNS 116 may include a processing portion 204, a user interface portion 206, a communications portion 208, and a datastore portion 210. The datastore portion 210 may have stored thereon system data 212.

The processing portion 204 may include any hardware and/or software necessary for operating and/or controlling the user interface portion 206, the communications portion 208 and the datastore portion 210. For example, the processing portion 204 may be individual digital logic components, a processor, a microprocessor, and application-specific integrated circuit (ASIC), and the like. The processing portion 204 may include memory such as random access memory, register memory, cache memory and the like. Memory may include computer executable instructions by which the processing portion 204 may operate. For example, computer executable instructions may include computer executable code that, when executed, operate the relevant actions associated with the processing portion 204. For example, the computer executable instructions may operate the method provided in FIG. 4 and FIG. 4A.

The processor may be in communication with the user interface portion 206, the communications portion 208 and/or the datastore portion 210. The processing portion 204 may control the user interface portion 206. For example, the processing portion 204 may direct the user interface portion 206 to output information visually, electronically and/or audibly, and the processing portion 204 may direct the user interface portion 206 to receive input from the user, perhaps through electronic means. The processing portion 204 may control the communications portion 208. For example, the processing portion 204 may send and/or receive data via the communications portion 208. The processing portion 204 may operate on the datastore 210 to detect events, invoke actions, apply exceptions, and/or receive overrides.

The user interface portion 206 may be, in any combination of hardware and/or software, any component, system and/or subsystem for receiving input from a user and outputting information to the user. The user interface portion 206 may include a display and/or keyboard. The keyboard may be a numerical pad. For example, the user interface portion 206 may include a computer keypad, programmable softkeys, mechanical buttons, touch-screens, and/or the like. The user interface portion 206 may also include an electronic interface that may receive user instructions from the communications portion 208 that are sent from a remote location through the WCN 114, perhaps from the mobile device 112 or the personal computer 124. The display may provide visual output. The user interface potion may include a speaker for audio output. The user interface portion 206 may include a microphone for audible input.

The communications portion 208 may be, in any combination of hardware and/or software, any component, system, and/or subsystem for providing communications to and/or from the WCNS 116. The communication provided by the communications portion 208 may include, but is not limited to an Internet based connection, a wireless connection such as radio frequency for example, a telephone based dial-up connection and the like. The communications portion 208 may provide a wireless communications channel between the WCNS 116 and a peer device (not shown) and/or the WCN 114. The communications portion 208 may provide point-to-point wireless communications between the WCNS 116 and a peer device. The wireless communications portion 208 may provide radio frequency (RF) communications between the WCNS 116 and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+ EDR, Institute of Electrical and Electronics Engineers, Inc. (IEEE) specification 802.15.1, or the like.

Figure 7:
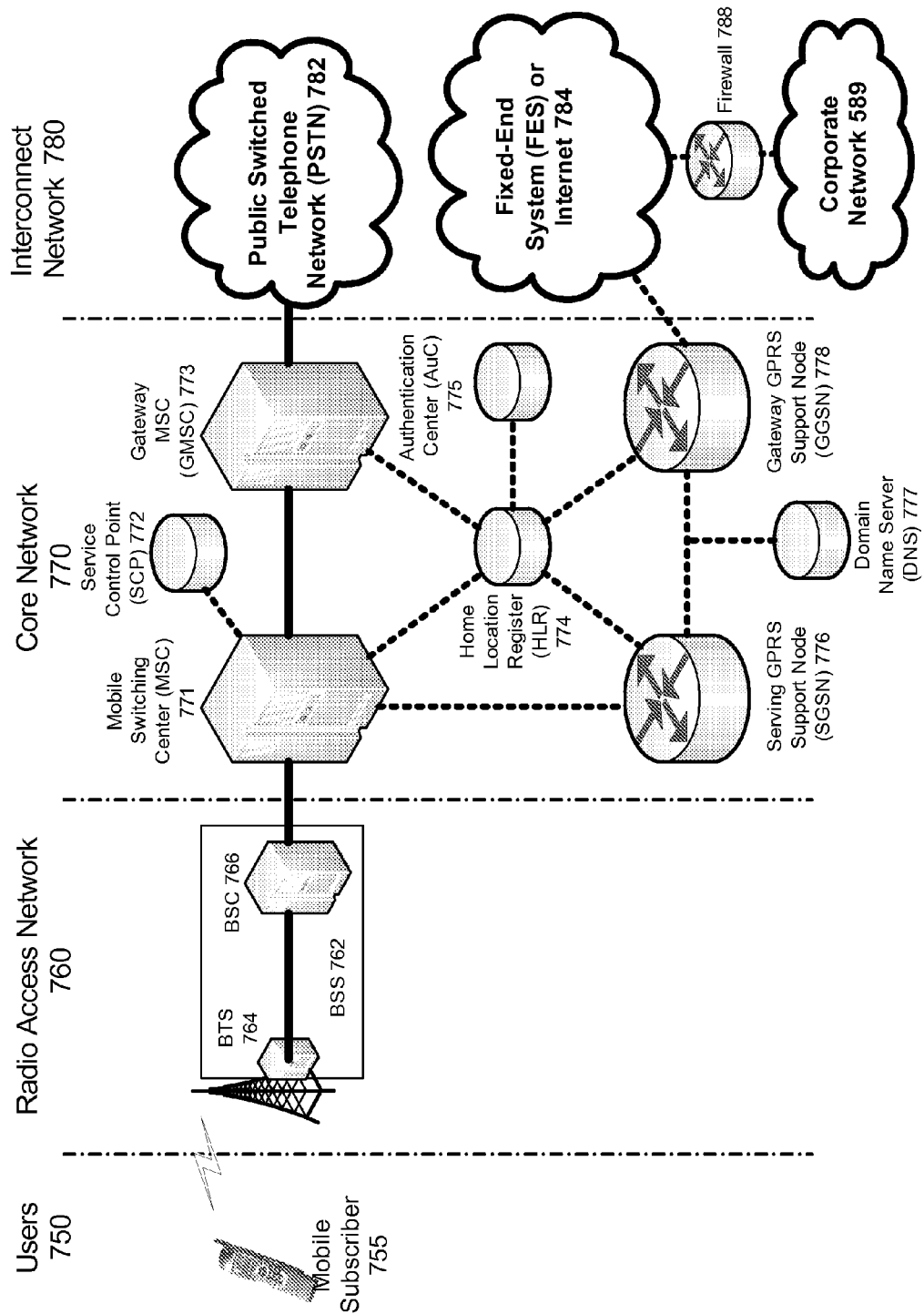
FIG. 7 depicts a GPRS network architecture in which aspects of an embodiment may be implemented.

The communications portion 208 may provide a wireless communications channel between the WCNS 116 and the WCN 114 such as the radio access network 760 (see FIG. 7). The communications portion 208 may provide cellular communications. The communication portion 208 may provide wireless data network communications such as, Wi-Fi (IEEE 802.11) and WiMAX (IEEE 802.16) for example.

The datastore 210 may be any component, system, and/or subsystem suitable for storing data. For example, the datastore portion 210 may include random access memory, flash memory, magnetic storage, and/or the like.

The datastore 210 may store thereon system data 212. The system data 212 may include contact information, e-mail data, spreadsheets, word processing data, task data, and/or the like.

Figure 3:
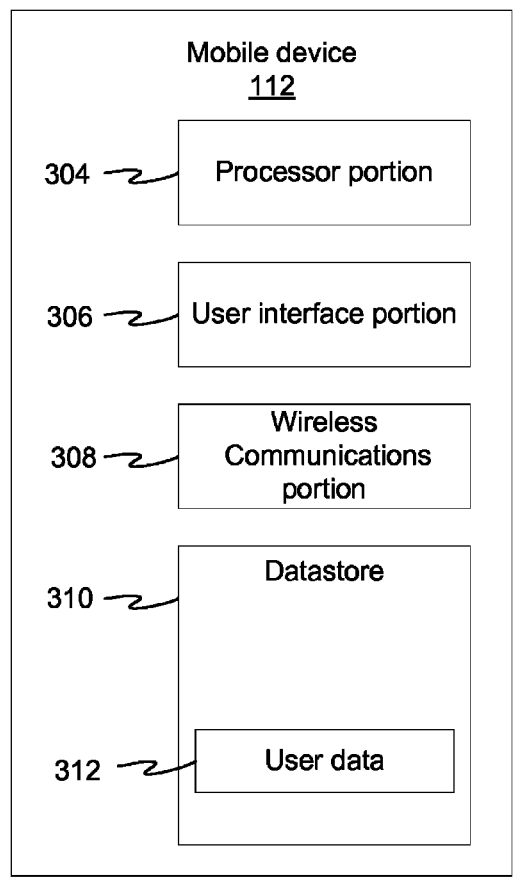
FIG. 3 depicts a block diagram of a mobile device in which aspects of an embodiment may be implemented.

FIG. 3 depicts a block diagram of an example mobile device 112 which may be implemented in embodiments. The mobile device 112 may include a processing portion 304, a user interface portion 306, a communications portion 308, and a datastore portion 310. The datastore portion 310 may have stored thereon user data 312.

The processing portion 304 may include any hardware and/or software necessary for operating and/or controlling the user interface portion 306, the wireless communications portion 308 and the datastore portion 310. For example, the processing portion 304 may be individual digital logic components, a processor, a microprocessor, and application-specific integrated circuit (ASIC), and the like. The processing portion 304 may include memory such as random access memory, register memory, cache memory and the like. Memory may include computer executable instructions by which the processing portion 304 may operate. For example, computer executable instructions may include computer executable code that, when executed, operate the relevant actions associated with the processing portion 304. For example, the computer executable instructions may operate the method provided in FIG. 5 and FIG. 5A.

The processor portion 304 may be in communication with the user interface portion 306, the wireless communications portion 308 and/or the datastore portion 310. The processing portion 304 may control the user interface portion 306. For example, the processing portion 304 may direct the user interface portion 306 to output information visually and/or audibly, and the processing portion 304 may direct the user interface portion 306 to receive input from the user. The processing portion 304 may control the wireless communications portion 308. For example, the processing portion 304 may send and/or receive data via the wireless communications portion 308. The processing portion 304 may operate on the datastore 310 to detect events, invoke actions, apply exceptions, and/or receive overrides.

The user interface portion 306 may be, in any combination of hardware and/or software, any component, system and/or subsystem for receiving input from a user and outputting information to the user. The user interface portion 306 may include a display and/or keyboard. The keyboard may be a numerical pad. For example, the user interface portion 306 may include a telephone keypad, programmable softkeys, operators such as but not limited to mechanical buttons and other input/out devices, touch-screens, and/or the like. The display may provide visual output. The user interface potion 306 may include a speaker for audio output. The user interface portion 306 may include a microphone for audible input.

The wireless communications portion 308 may be, in any combination of hardware and/or software, any component, system, and/or subsystem for providing wireless communications to and/or from the mobile device 112. The wireless communications portion 308 may provide a wireless communications channel between the mobile device 112 and a peer device (now shown) or the WCN 114. The wireless communications portion 308 may provide point-to-point wireless communications between the mobile device 112 and a peer device. The wireless communications portion 308 may provide radio frequency (RF) communications between the device and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+ EDR, Institute of Electrical and Electronics Engineers, Inc. (IEEE) specification 802.15.1, or the like.

The wireless communications portion 308 may provide a wireless communications channel between the mobile device 112 and the WCN 114 such as the radio access network 760 (see FIG. 7). The wireless communications portion 308 may provide a cellular communications. The wireless communication portion 308 may provide wireless data network communications such as, Wi-Fi (IEEE 802.11) and WiMAX (IEEE 802.16) for example.

The datastore 310 may be any component, system, and/or subsystem suitable for storing data. For example, the datastore portion 310 may include random access memory, flash memory, magnetic storage, and/or the like.

The datastore 310 may store thereon user data 312. The user data 312 may include contact information, e-mail data, spreadsheets, word processing data, task data, and/or the like. In an embodiment, the processor may invoke an action to delete and/or encrypt the user data 312.

Referring to FIG. 1 to FIG. 3, in an embodiment, the WCN 114 may be in wireless communication with the mobile device 112. The WCN 114 may include the CMS 118 and the WCNS 116 as part of the network. The processor portion 204 of the WCNS 116 may be configured to include two modes. A first mode, when activated, may put a call to the mobile device 112 in a hold state. This may provide the mobile device user 126 with the capability to maintain the connection to the call while the user 126 may attempt to find a better location in which to engage with the call or to complete a call that was already in progress when a new call arrived. The hold state initiated by a first activation of the first mode may continue for a first predetermined time period. The first predetermined time period may be, but is not limited to a default setting of the WCNS 116 or time period determined by the user 126.

A second mode, when activated, may put a call that is in the hold state in communication with the CMS 118 when the second mode is activated. The call (or caller) may signal the WCNS 116 to initiate an activation of the second mode, thereby giving the caller an option to leave a message for the user 126 without waiting for the user 126 to terminate the hold state and engage the caller in conversation. The caller may signal the WCNS 116 to activate the second mode in a number of ways, including but not limited to pressing one or more predetermined keys on the caller's telephone keypad or speaking a predetermined verbal command into the caller's telephone audio input port (microphone), and the like.

The processor portion 204 of the WCNS 116 may be configured to include a third mode. The third mode may terminate the hold state and connect the call with the user 126 upon a signal by the user 126 to the WCNS 116 to activate the third mode.

The WCN 114 may include the first prerecorded message (FPM) 120. The WCNS 116 can be configured to put the FPM 120 in communication with the call when the user 126 signals the WCNS 116 to initiate a first activation of the first mode. The FPM 120 may encourage the caller to remain in the hold state and may also inform the caller that the user 126 is not available at the time to engage with the call but is attempting to get to a location in which the user 126 will be able to do so, or the like. The FPM 120 may be a default WCN 114 message or may be a message personally recorded by the user 126. A personally recorded FPM 120 may convey any information the user 126 wishes to communicate to a call in the hold state. A personally recorded FPM 120 may be created for a call whose identification can be recognized by the WCNS 116. The WCNS 116 may be configured to put a call identification specific FPM 120 in communication with a call having the corresponding identification upon a first activation of the first mode.

The FPM 120 may inform the call of how the call may exercise the option to connect to the CMS 118 in lieu of remaining in the hold state. If the call is using Internet Protocol (IP) based communications that uses techniques such as but not limited to session initiated protocol (SIP) based voice-over-IP (VoIP) the call can make the selection to be connected to the CMS 118 with or without receiving a prompt to do so from the FPM 120. Cell phones, desk set telephones, satellite phones, and the like may be used for the call with the embodiments, with or without SIP based on VoIP capability. The FPM 120 may be stored in the datastore 210 as system data 212, the FPM 120 may be stored in the memory of the processor portion 204, or the FPM 120 may be implemented in a distinct component of the WCN 114, or the like. The FPM 120 may be repeated for the entirety of the first predetermined time period or until the call self-terminates or makes the selection to connect to the CMS 118.

The WCN 114 may also include a second prerecorded message (SPM) 122. The WCNS 116 can be configured to put the SPM 122 in communication with the call when the user signals the WCNS 116 to initiate a second activation of the first mode. A second activation of the first mode may maintain the call in a hold state for a second predetermined time period. The second predetermined time period may be, but is not limited to a default setting of the WCNS 116 or a time period determined by the user 126. The first and second predetermined time periods may be equal. The WCNS 116 may be configured to maintain the communication between the FPM 120 and the call when a second activation of the first mode is made.

The WCNS 116 may be configured to either connect the call to the CMS 118 or terminate the call if either the first or second predetermined time period ends without the caller terminating the call or opting to connect to the CMS 118.

The WCNS 116 may be configured to initiate a first or second activation of the first mode upon a signal from the user 126 through the mobile device 112 on a call-by-call instance. Upon receiving a new call, the user 126 may determine that the user 126 cannot take the call at the time the call is received, but wants to prevent the call from either self-terminating or being redirected to the CMS 118. By way of example and not limitation, the user 126 may contact a first button on the mobile device 112, which is a specific type of interface operator, perhaps referred to as a hold button, to signal the WCNS 116 to initiate the first activation of the first mode. The WCNS 116 may keep track of the number of activations of the first mode for each call. If the user 126 decides that additional hold time is needed, the user 126 may contact the first button for a second time for the same call to signal the WCNS 116 to initiate a second activation of the first mode.

The user 126 may signal the WCNS 116 to initiate an activation of the third mode by contacting a second button (or operator) of the mobile device 112. Upon determining that the user 126 can engage with the call that is on hold, the user 126 may contact the second button to have the WCNS 116 initiate the third mode to put the call into communication with the user 126.

The WCNS 116 may be configured to provide the user 126 with the capability to, in-turn, configure or designate the WCNS 116 to initiate the first activation of the first mode when the WCNS 116 determines that a predetermined condition has occurred. Predetermined conditions could include, but are not limited to the WCNS 116 recognizing a call identification designated by the user 126, the WCNS 116 receiving a call during a predetermined time of day designated by the user 126 or receiving a call during a predetermined calendar day designated by the user 126, or combinations of these conditions or the like. If the WCNS 116 is configured or designated to initiate the first activation of the first mode upon an occurrence of a predetermined condition, then a call that satisfies one of the predetermined conditions may be placed in the hold state automatically by the WCNS 116. The WCNS 116 may communicate to the mobile device 112 that a call has been put in the hold state automatically. The mobile device 112 may indicate to the user 126 that a call has been put in hold automatically by generating an audible, visual or vibration signal, or the like.

The WCNS 116 may be in communication with the Internet, and if so, the user 126 may configure the WCNS 116 through a computer interface such as 124 that is also in communication with the Internet. The user 126 may also configure the WCNS 116 through the mobile device 112.

Referring again to FIG. 1 to FIG. 3, in another embodiment, the mobile device 112 may be in wireless communication with the WCN 114. The WCN 114 may include the CMS 118. The processor portion 304 of the mobile device 112 may be configured to include two modes. A first mode, when activated, may put a call to the mobile device 112 in a hold state. This may provide the mobile device user 126 with the capability to maintain the connection to the call while the user 126 may attempt to find a better location in which to engage with the call or to complete a call that was already in progress when a new call arrived. The hold state initiated by a first activation of the first mode may continue for a first predetermined time period. The first predetermined time period may be, but is not limited to a default setting of the mobile device 112 or time period determined by the user 126.

A second mode, when activated, may put a call that is in the hold state in communication with the CMS 118 when the second mode is activated. The call (or caller) may signal the mobile device 112 to initiate an activation of the second mode, thereby giving the caller an option to leave a message for the user 126 without waiting for the user 126 to terminate the hold state and engage the caller in conversation. The caller may signal the mobile device 112 to activate the second mode in a number of ways, including but not limited to pressing one or more predetermined keys on the caller's telephone keypad or speaking a predetermined verbal command into the caller's telephone audio input port (microphone), and the like.

The processor portion 304 of the mobile device 112 may be configured to include a third mode. The third mode may terminate the hold state and connect the call with the user 126 upon a signal by the user 126 to the mobile device 112 to activate the third mode.

The mobile device 112 may include the first prerecorded message (FPM) 120. The mobile device 112 can be configured to put the FPM 120 in communication with the call when the user 126 signals the mobile device 112 to initiate a first activation of the first mode. The FPM 120 may encourage the caller to remain in the hold state and may also inform the caller that the user 126 is not available at the time to engage with the call but is attempting to get to a location in which the user 126 will be able to do so, or the like. The FPM 120 may be a default mobile device 112 message or may be a message personally recorded by the user 126. A personally recorded FPM 120 may convey any information the user 126 wishes to communicate to a call in the hold state. A personally recorded FPM 120 may be created for a call whose identification can be recognized by the mobile device 112. The mobile device 112 may be configured to put a call identification specific FPM 120 in communication with a call having the corresponding identification upon a first activation of the first mode.

The FPM 120 may inform the caller of how the caller may exercise the option to connect to the CMS 118 in lieu of remaining in the hold state. If the call is using Internet Protocol (IP) based communications that uses techniques such as but not limited to session initiated protocol (SIP) based voice-over-IP (VoIP) the call can make the selection to be connected to the CMS 118 with or without receiving a prompt to do so from the FPM 120. Cell phones, desk set telephones, satellite phones, and the like may be used for the call with the embodiments, with or without SIP based on VoIP capability. The FPM 120 may be stored in the datastore 310 as user data 312, or the FPM 120 may be stored in the memory of the processor portion 304, or the like. The FPM 120 may be repeated for the entirety of the first predetermined time period or until the call self-terminates or makes the selection to connect to the CMS 118.

The mobile device 112 may also include a second prerecorded message (SPM) 122. The mobile device 112 can be configured to put the SPM 122 in communication with the call when the user signals the mobile device 112 to initiate a second activation of the first mode. A second activation of the first mode may maintain the call in a hold state for a second predetermined time period. The second predetermined time period may be, but is not limited to a default setting of the mobile device 112 or a time period determined by the user 126. The first and second predetermined time periods may be equal. The mobile device 112 may be configured to maintain the communication between the FPM 120 and the call when a second activation of the first mode is made.

The mobile device 112 may be configured to either connect the call to the CMS 118 or terminate the call if either the first or second predetermined time period ends without the caller terminating the call or opting to connect to the CMS 118.

The mobile device 112 may be configured to initiate a first or second activation of the first mode upon a signal from the user 126 through the mobile device 112 on a call-by-call instance. Upon receiving a new call, the user 126 may determine that the user 126 cannot take the call at the time the call is received, but wants to prevent the call from either self-terminating or being redirected to the CMS 118. By way of example and not limitation, the user 126 may contact a first button on the mobile device 112, which is a specific type of interface operator, perhaps referred to as a hold button, to signal the mobile device 112 to initiate the first activation of the first mode. The mobile device 112 may keep track of the number of activations of the first mode for each call. If the user 126 decides that additional hold time is needed, the user 126 may contact the first button for a second time for the same call to signal the mobile device 112 to initiate a second activation of the first mode.

The user 126 may signal the mobile device 112 to initiate an activation of the third mode by contacting a second button (or operator) of the mobile device 112. Upon determining that the user 126 can engage with the call that is on hold, the user 126 may contact the second button to have the mobile device 112 initiate the third mode to put the call into communication with the user 126.

The mobile device 112 may be configured to provide the user 126 with the capability to, in-turn, configure or designate the mobile device 112 to initiate the first activation of the first mode when the mobile device 112 determines that a predetermined condition has occurred. Predetermined conditions could include, but are not limited to the mobile device 112 recognizing a call identification designated by the user 126, the mobile device 112 receiving a call during a predetermined time of day designated by the user 126 or receiving a call during a predetermined calendar day designated by the user 126, or combinations of these conditions or the like. If the mobile device 112 configured or designated to initiate the first activation of the first mode upon an occurrence of a predetermined condition, then a call that satisfies one of the predetermined conditions may be placed in the hold state automatically by the mobile device 112. The mobile device 112 may indicate to the user 126 that a call has been put in hold automatically by generating an audible, visual or vibration signal, or the like.

Figure 4:
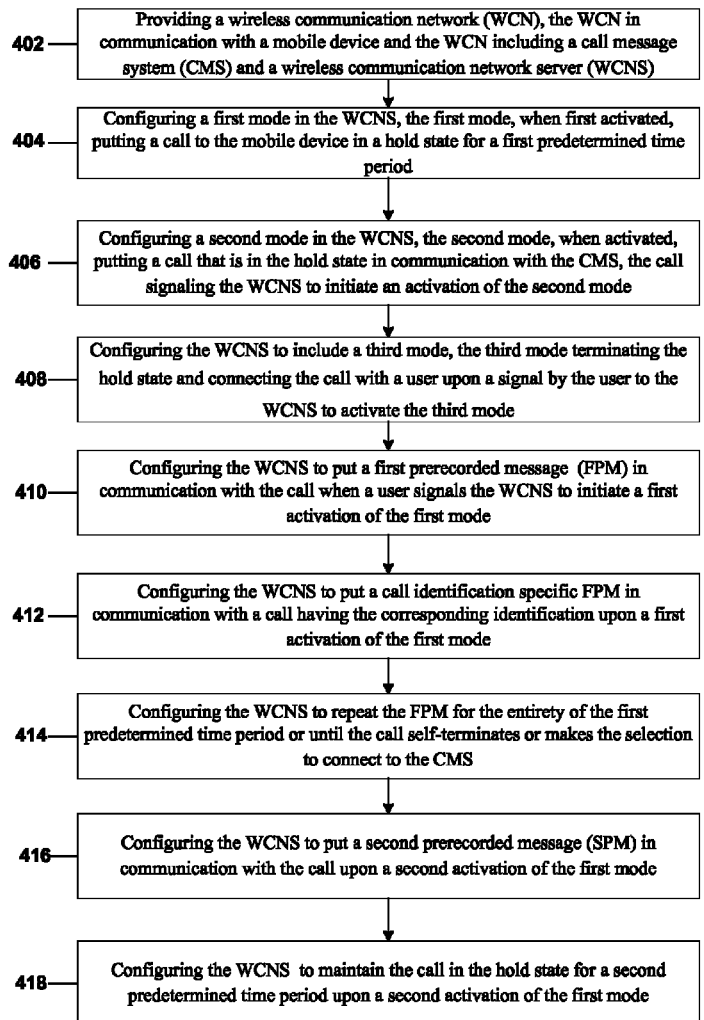
FIG. 4 depicts a process in which aspects of an embodiment may be implemented.
Figure 4A:
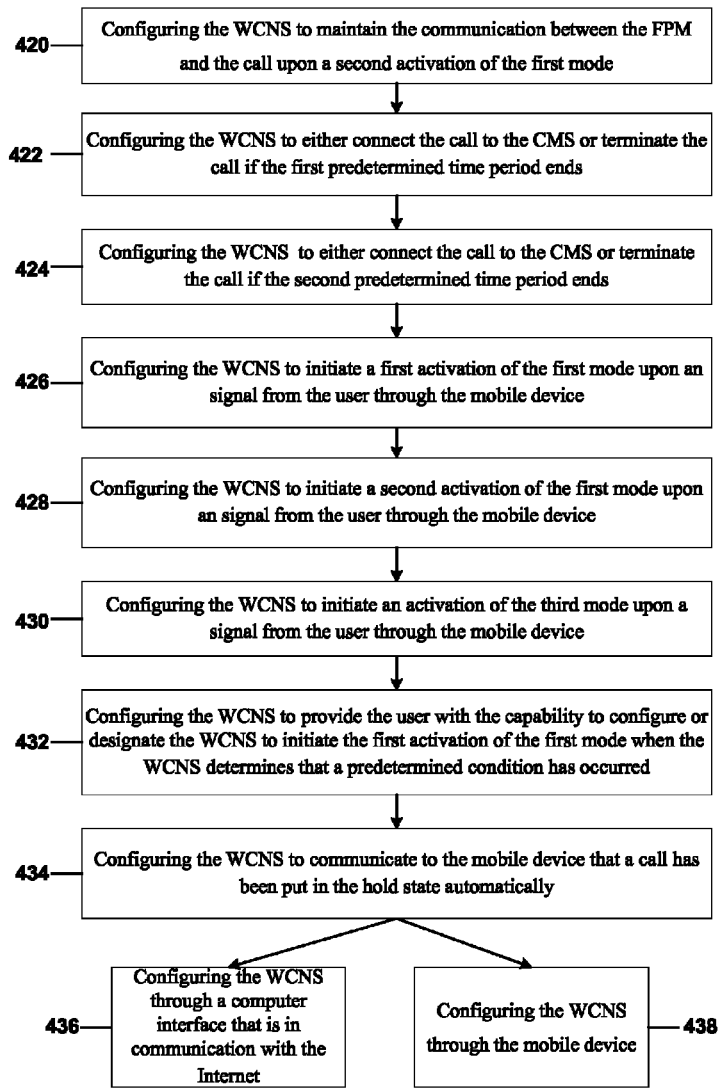
FIG. 4A depicts a continuation of the process described in FIG. 4.

FIG. 4 and FIG. 4A illustrate a flow chart of an example process for configuring a wireless communication network, such as but not limited to WCN 114. Referring to FIG. 4 and FIG. 4A as well as FIG. 1 to FIG. 3, in another embodiment, the WCN 114 may be provided in step 402 that may be in wireless communication with the mobile device 112. The WCN 114 may include the CMS 118 and the WCNS 116 as part of the network. In step 404, a first mode is configured in the WCNS 116. The first mode, when activated, may put a call to the mobile device 112 in a hold state. The hold state initiated by a first activation of the first mode may continue for a first predetermined time period. The first predetermined time period may be, but is not limited to a default setting of the WCNS 116 or time period determined by the user 126.

In step 406, a second mode may be configured in the WCNS 116. The second mode, when activated, may put a call that is in the hold state in communication with the CMS 118 when the second mode is activated. The call (or caller) may signal the WCNS 116 to initiate an activation of the second mode in a number of ways, including but not limited to pressing one or more predetermined keys on the caller's telephone keypad or speaking a predetermined verbal command into the caller's telephone audio input port (microphone), and the like.

In step 408, the WCNS 116 may be configured to include a third mode. The third mode may terminate the hold state and connect the call with the user 126 upon a signal by the user 126 to the WCNS 116 to activate the third mode.

The WCN 114 may include the first prerecorded message (FPM) 120. In step 410, the WCNS 116 may be configured to put the FPM 120 in communication with the call when the user 126 signals the WCNS 116 to initiate a first activation of the first mode. The FPM 120 may encourage the caller to remain in the hold state and may also inform the caller that the user 126 is not available at the time to engage with the call but is attempting to get to a location in which the user 126 will be able to do so, or the like. The FPM 120 may be a default WCN 114 message or may be a message personally recorded by the user 126. A personally recorded FPM 120 may convey any information the user 126 wishes to communicate to a call in the hold state. A personally recorded FPM 120 may be created for a call whose identification can be recognized by the WCNS 116. In step 412, the WCNS 116 may be configured to put a call identification specific FPM 120 in communication with a call having the corresponding identification upon a first activation of the first mode.

The FPM 120 may inform the call of how the call may exercise the option to connect to the CMS 118 in lieu of remaining in the hold state. If the call is using Internet Protocol (IP) based communications that uses techniques such as but not limited to session initiated protocol (SIP) based voice-over-IP (VoIP) the call can make the selection to be connected to the CMS 118 with or without receiving a prompt to do so from the FPM 120. Cell phones, desk set telephones, satellite phones, and the like may be used for the call with the embodiments, with or without SIP based on VoIP capability. In step 414, the WCNS 116 may be configured to repeat the FPM 120 for the entirety of the first predetermined time period or until the call self-terminates or makes the selection to connect to the CMS 118.

The WCN 114 may also include a second prerecorded message (SPM) 122. In step 416, the WCNS 116 may be configured to put the SPM 122 in communication with the call when the user signals the WCNS 116 to initiate a second activation of the first mode. In step 418, the WCNS 116 may be configured to maintain the call in the hold state for a second predetermined time period upon a second activation of the first mode. The second predetermined time period may be, but is not limited to a default setting of the WCNS 116 or a time period determined by the user 126. The first and second predetermined time periods may be equal. In step 420, the WCNS 116 may be configured to maintain the communication between the FPM 120 and the call when a second activation of the first mode is made.

In steps 422 and 424, the WCNS 116 may be configured to either connect the call to the CMS 118 or terminate the call if either the first or second predetermined time period, respectively, ends without the caller terminating the call or opting to connect to the CMS 118.

In steps 426 and 428, the WCNS 116 may be configured to initiate a first or second activation, respectively, of the first mode upon a signal from the user 126 through the mobile device 112 on a call-by-call instance. By way of example and not limitation, for step 426 the WCNS 116 may be configured to initiate the first activation of the first mode when the user 126 contacts a first button on the mobile device 112, which is a specific type of interface operator, perhaps referred to as a hold button. The WCNS 116 may keep track of the number of activations of the first mode for each call. By way of example and not limitation, for step 428 the WCNS 116 may be configured to initiate a second activation of the first mode when the user 126 contacts the first button for a second time for the same call.

In step 430, the WCNS 116 may be configured to initiate an activation of the third mode upon a contact with a second button (or operator) of the mobile device 112. By way of example and not limitation for step 430, the WCNS 116 may be configured to initiate the third mode to put the call into communication with the user 126 upon the user 126 contacting the second button of the mobile device 112.

In step 432, the WCNS 116 may be configured to provide the user 126 with the capability to, in-turn, configure or designate the WCNS 116 to initiate the first activation of the first mode when the WCNS 116 determines that a predetermined condition has occurred. Predetermined conditions could include, but are not limited to the WCNS 116 recognizing a call identification designated by the user 126, the WCNS 116 receiving a call during a predetermined time of day designated by the user 126 or receiving a call during a predetermined calendar day designated by the user 126, or combinations of these conditions or the like. In step 434, the WCNS 116 may be configured to communicate to the mobile device 112 that a call has been put in the hold state automatically. The mobile device 112 may indicate to the user 126 that a call has been put in hold automatically by generating an audible, visual or vibration signal, or the like.

The WCNS 116 may be in communication with the Internet. If so, in step 436 the user 126 may configure the WCNS 116 through a computer interface such as 124 that is also in communication with the Internet. In step 438, the user 126 may also configure the WCNS 116 through the mobile device 112.

Figure 5:
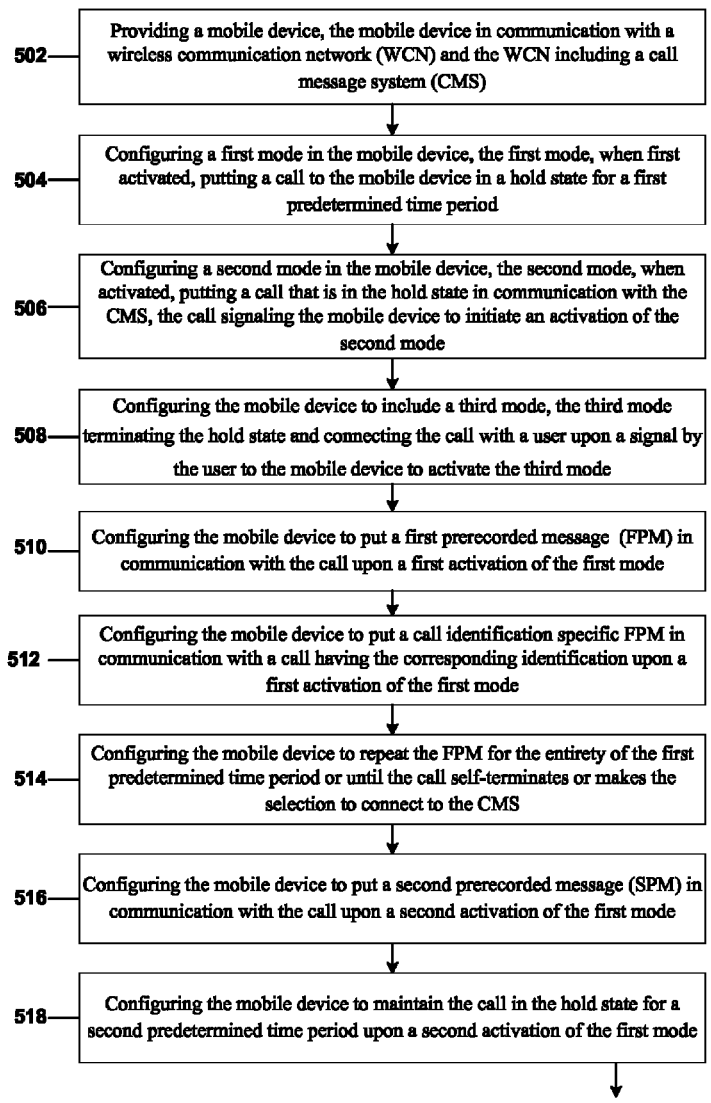
FIG. 5 depicts a process in which aspects of an embodiment may be implemented.
Figure 5A:
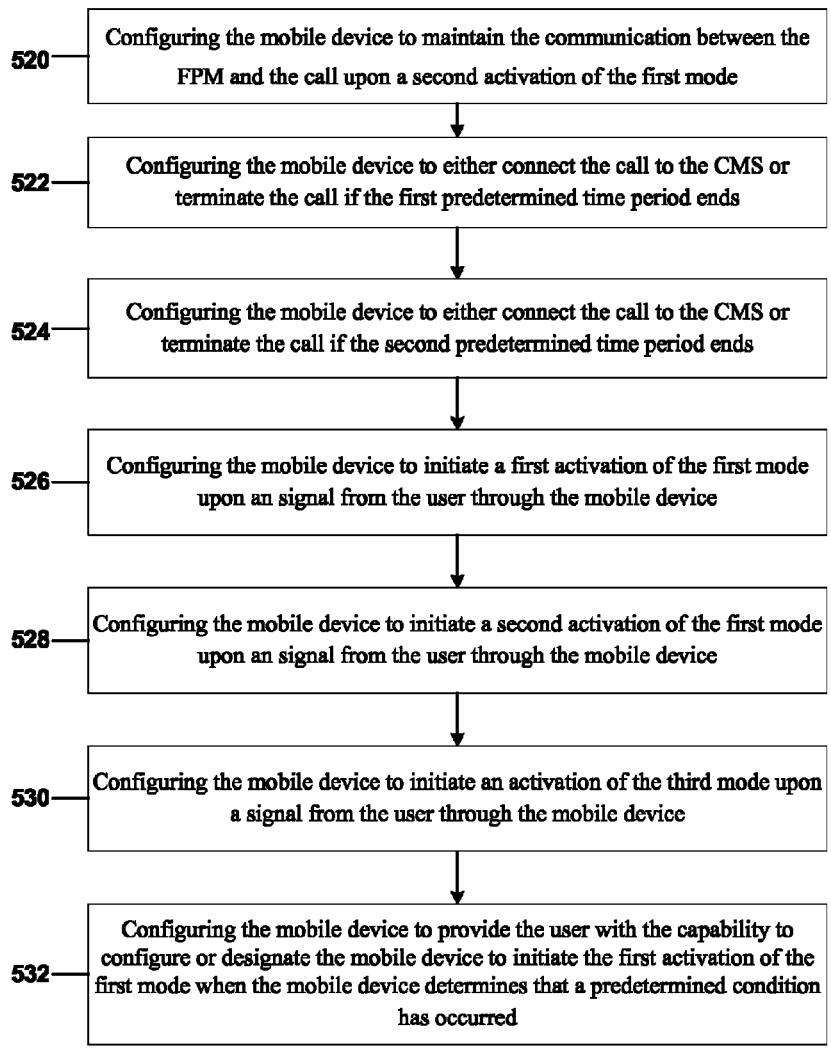
FIG. 5A depicts a continuation of the process described in FIG. 5.

FIG. 5 and FIG. 5A illustrate a flow chart of an example process for configuring a mobile device, such as but not limited to mobile device 112. Referring to FIG. 5 and FIG. 5A as well as FIG. 1 to FIG. 3, in another embodiment, the mobile device 112 may be provided in step 502 that may be in wireless communication with the WCN 114. The WCN 114 may include the CMS 118 as part of the network. In step 504, a first mode is configured in the mobile device 112. The first mode, when activated, may put a call to the mobile device 112 in a hold state. The hold state initiated by a first activation of the first mode may continue for a first predetermined time period. The first predetermined time period may be, but is not limited to a default setting of the mobile device 112 or time period determined by the user 126.

In step 506, a second mode may be configured in the mobile device 112. The second mode, when activated, may put a call that is in the hold state in communication with the CMS 118 when the second mode is activated. The call (or caller) may signal the mobile device 112 to initiate an activation of the second mode in a number of ways, including but not limited to pressing one or more predetermined keys on the caller's telephone keypad or speaking a predetermined verbal command into the caller's telephone audio input port (microphone), and the like.

In step 508, the mobile device may be configured to include a third mode. The third mode may terminate the hold state and connect the call with the user 126 upon a signal by the user 126 to the mobile device 112 to activate the third mode.

The mobile device 112 may include the first prerecorded message (FPM) 120. In step 510, the mobile device 112 may be configured to put the FPM 120 in communication with the call when the user 126 signals the mobile device 112 to initiate a first activation of the first mode. The FPM 120 may encourage the caller to remain in the hold state and may also inform the caller that the user 126 is not available at the time to engage with the call but is attempting to get to a location in which the user 126 will be able to do so, or the like. The FPM 120 may be a default mobile device 112 message or may be a message personally recorded by the user 126. A personally recorded FPM 120 may convey any information the user 126 wishes to communicate to a call in the hold state. A personally recorded FPM 120 may be created for a call whose identification can be recognized by the mobile device 112. In step 512, the mobile device 112 may be configured to put a call identification specific FPM 120 in communication with a call having the corresponding identification upon a first activation of the first mode.

The FPM 120 may inform the call of how the call may exercise the option to connect to the CMS 118 in lieu of remaining in the hold state. If the call is using Internet Protocol (IP) based communications that uses techniques such as but not limited to session initiated protocol (SIP) based voice-over-IP (VoIP) the call can make the selection to be connected to the CMS 118 with or without receiving a prompt to do so from the FPM 120. Cell phones, desk set telephones, satellite phones, and the like may be used for the call with the embodiments, with or without SIP based on VoIP capability. In step 514, the mobile device 112 may be configured to repeat the FPM 120 for the entirety of the first predetermined time period or until the call self-terminates or makes the selection to connect to the CMS 118.

The mobile device 112 may also include a second prerecorded message (SPM) 122. In step 516, the mobile device 112 may be configured to put the SPM 122 in communication with the call when the user signals the mobile device 112 to initiate a second activation of the first mode. In step 518, the mobile device may be configured to maintain the call in the hold state for a second predetermined time period upon a second activation of the first mode. The second predetermined time period may be, but is not limited to a default setting of the mobile device 112 or a time period determined by the user 126. The first and second predetermined time periods may be equal. In step 520, the mobile device 112 may be configured to maintain the communication between the FPM 120 and the call when a second activation of the first mode is made.

In steps 522 and 524, the mobile device 112 may be configured to either connect the call to the CMS 118 or terminate the call if either the first or second predetermined time period, respectively, ends without the caller terminating the call or opting to connect to the CMS 118.

In steps 526 and 528, the mobile device 112 may be configured to initiate a first or second activation, respectively, of the first mode upon a signal from the user 126 through the mobile device 112 on a call-by-call instance. By way of example and not limitation, for step 526 the mobile device 112 may be configured to initiate the first activation of the first mode when the user 126 contacts a first button on the mobile device 112, which is a specific type of interface operator, perhaps referred to as a hold button. The mobile device 112 may keep track of the number of activations of the first mode for each call. By way of example and not limitation, for step 528 the mobile device 112 may be configured to initiate a second activation of the first mode when the user 126 contacts the first button for a second time for the same call.

In step 530, the mobile device 112 may be configured to initiate an activation of the third mode upon a contact with a second button (or operator) of the mobile device 112. By way of example and not limitation for step 530, the mobile device 112 may be configured to initiate the third mode to put the call in communication with the user 126 upon the user 126 contacting the second button of the mobile device 112.

In step 532, the mobile device 112 may be configured to provide the user 126 with the capability to, in-turn, configure or designate the mobile device 112 to initiate the first activation of the first mode when the mobile device 112 determines that a predetermined condition has occurred. Predetermined conditions could include, but are not limited to the mobile device 112 recognizing a call identification designated by the user 126, the mobile device 112 receiving a call during a predetermined time of day designated by the user 126 or receiving a call during a predetermined calendar day designated by the user 126, or combinations of these conditions or the like. The mobile device 112 may indicate to the user 126 that a call has been put in hold automatically by generating an audible, visual or vibration signal, or the like.

The following description sets forth some exemplary telephony radio networks and non-limiting operating environments for the wireless communications system 110. The below-described operating environments should be considered non-exhaustive, however, and thus the below-described network architectures merely show how the above described embodiments of the WCNS 116 and/or the mobile device 112 may be incorporated into existing network structures and architectures. It can be appreciated, however, that the above described embodiments of the WCNS 116 and/or the mobile device 112 can be incorporated into existing and future alternative architectures for wireless communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the above described embodiments of the WCNS 116 and/or the mobile device 112 can be applied independently of the method for data transport, and do not depend on any particular network architecture, or underlying protocols.

Figure 6:
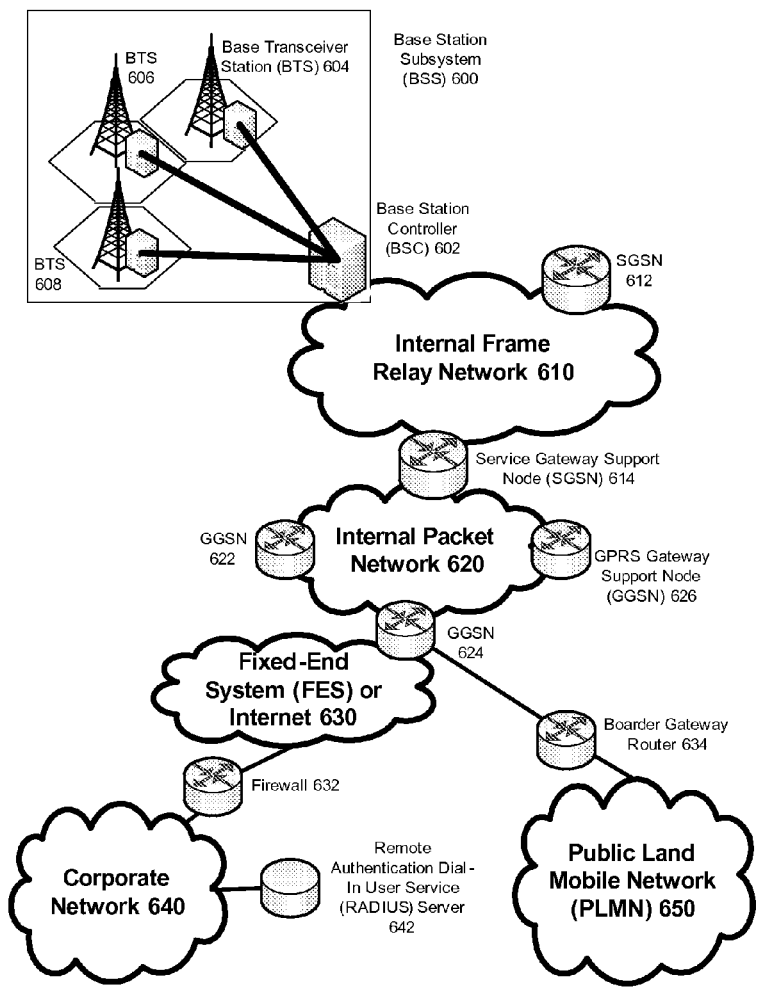
FIG. 6 depicts an overview of a network environment in which aspects of an embodiment may be implemented.

FIG. 6 depicts an overall block diagram of an exemplary packet-based mobile cellular network environment, such as a GPRS network, in which the system for implementing a configuration of the above wireless communication system 110 can be practiced. In an example configuration, the above described embodiments of the WCNS 116 are encompassed by elements of the network environment depicted in FIG. 6. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In exemplary fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

FIG. 7 illustrates an architecture of a typical GPRS network as segmented into four groups: users 750, radio access network 760, core network 770, and interconnect network 780. In an example configuration the wireless communication system 110, the system is encompassed by the radio access network 760, core network 770, and interconnect network 780. Users 750 comprise a plurality of end users (though only mobile subscriber 755 is shown in FIG. 7). In an example embodiment, the device depicted as mobile subscriber 755 could comprise the user 126 and/or the mobile device 112. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, like the above describer end user 126, and sometimes to the actual portable device, such as the above described mobile device 112, used by an end user of the mobile cellular service. Different element numbers may be used. When a mobile subscriber turns on his or her mobile device, the mobile device goes through an attach process by which the mobile device attaches to an SGSN of the GPRS network. In FIG. 7, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of the above described wireless communication system 110 and the embodiments of the WCNS 116 and/or the mobile device 112 can include but are not limited to Gateway GPRS Support Node tables, Fixed End System router tables, firewall systems, VPN tunnels, and any number of other network elements as required by the particular digital network.

FIG. 8 illustrates another exemplary block diagram view of a GSM/GPRS/IP multimedia network architecture 800 in which the above described embodiments of the WCNS 116 and/or the mobile device 112 can be incorporated. As illustrated, architecture 800 of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The WCNS 116 could be implemented in the BSC 806. The MS 802 is physical equipment or Mobile Equipment (ME), such as a mobile phone (such as mobile device 112) or a laptop computer that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides inter-working functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides inter-working functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF)

842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed:

1. A mobile device comprising:
memory having executable instructions stored thereon;
a processor coupled to the memory, wherein the processor, when executing the executable instructions, effectuates operations comprising:
implementing a first mode, the first mode putting a call to a mobile device in a hold state for a first predetermined time period upon a first activation of the first mode;
putting a call identification specific message in communication with the call;
determining whether to initiate a second activation of the first mode upon conclusion of the first predetermined time period;
when it is determined to initiate the second activation of the first mode, initiating the second activation of the first mode to put the call in a hold state for a second predetermined time period;
keeping track of a number of activations of the first mode for the call; and
based on the number of activations of the first mode for the call, implementing a second mode, the second mode putting the call that is in the hold state in communication with a call message system upon an activation of the second mode, the mobile device activating the second mode upon a signal from the call.

2. The mobile device of claim 1, the operations further comprising providing the call identification specific message upon the first activation of the first mode.

3. The mobile device of claim 1, wherein the call identification specific message is one of a default message or a personal message.

4. The mobile device of claim 1, wherein the call identification specific message provides a status of a user of the mobile device.

5. The mobile device of claim 1, wherein the call identification specific message provides a notification that the call may be put in communication with the call message system.

6. The mobile device of claim 1, the operations further comprising providing a second prerecorded message upon the second activation of the first mode.

7. The mobile device of claim 1, the operations further comprising initiating the first activation of the first mode upon an occurrence of at least one predetermined condition.

8. The mobile device of claim 7, wherein the predetermined condition comprises at least one of a predetermined call identification, a call during a predetermined time of day, or a call during a predetermined calendar day.

9. The mobile device of claim 1, wherein the first activation of the first mode is initiated upon a contact with at least one operator.

10. The mobile device of claim 1, the operations further comprising putting a first prerecorded message in communication with the call to the mobile device upon the first activation of the first mode and the call to the mobile device having a predetermined identification.

11. A method comprising:
implementing a first mode, the first mode putting a call to a mobile device in a hold state for a first predetermined time period upon a first activation of the first mode;
putting a call identification specific message in communication with the call;
determining whether to initiate a second activation of the first mode upon conclusion of the first predetermined time period;
when it is determined to initiate the second activation of the first mode, initiating the second activation of the first mode to put the call in a hold state for a second predetermined time period;
keeping track of a number of activations of the first mode for the call; and
based on the number of activations of the first mode for the call, implementing a second mode, the second mode putting the call that is in the hold state in communication with a call message system upon an activation of the second mode, the mobile device activating the second mode upon a signal from the call.

12. The method of claim 11, further comprising providing the call identification specific message upon the first activation of the first mode.

13. The method of claim 12, wherein the call identification specific message provides a status of a user of the mobile device.

14. The method of claim 12, wherein the call identification specific message provides a notification that the call may be put in communication with the call message system.

15. The method of claim 12, further comprising providing a second prerecorded message upon a second activation of the first mode.

16. The method of claim 12, wherein the call identification specific message is one of a default message or a personal message.

17. The method of claim 11, further comprising initiating the first activation of the first mode upon an occurrence of at least one predetermined condition.

18. The method of claim 17, wherein the predetermined condition comprises at least one of a predetermined call identification, a call during a predetermined time of day, or a call during a predetermined calendar day.

19. The method of claim 11, further comprising initiating the first activation of the first mode upon a contact with at least one operator in communication with the mobile device.

20. The method of claim 11, further comprising putting a first prerecorded message corresponding to a call having a predetermined identification in communication with the call to the mobile device upon the first activation of the first mode and the call to the mobile device having the predetermined identification.

21. Memory comprising executable instructions that when executed by a processor cause the processor to effectuate operations comprising:
    implementing a first mode, the first mode putting a call to a mobile device in a hold state for a first predetermined time period upon a first activation of the first mode;
    putting a call identification specific message in communication with the call;
    determining whether to initiate a second activation of the first mode upon conclusion of the first predetermined time period;
    when it is determined to initiate the second activation of the first mode, initiating the second activation of the first mode to put the call in a hold state for a second predetermined time period;
    keeping track of a number of activations of the first mode for the call; and
    based on the number of activations of the first mode for the call, implementing a second mode, the second mode putting the call that is in the hold state in communication with a call message system upon an activation of the second mode, the mobile device activating the second mode upon a signal from the call.

22. The memory of claim 21, the operations further comprising providing the call identification specific message upon the first activation of the first mode.

23. The memory of claim 21, wherein the call identification specific message is one of a default message or a personal message.

24. The memory of claim 21, wherein the call identification specific message provides a status of a user of the mobile device.

25. The memory of claim 21, wherein the call identification specific message provides a notification that the call may be put in communication with the call message system.

26. The memory of claim 21, the operations further comprising providing a second prerecorded message upon the second activation of the first mode.

27. The memory of claim 21, the operations further comprising initiating the first activation of the first mode upon an occurrence of at least one predetermined condition.

28. The memory of claim 27, wherein the predetermined condition comprises at least one of a predetermined call identification, a call during a predetermined time of day, or a call during a predetermined calendar day.

29. The memory of claim 21, wherein the first activation of the first mode is initiated upon a contact with at least one operator.

30. The memory of claim 21, the operations further comprising putting a first prerecorded message in communication with the call to the mobile device upon the first activation of the first mode and the call to the mobile device having a predetermined identification.

\* \* \* \* \*